United States Patent
Kocur

[11] Patent Number: 5,913,201
[45] Date of Patent: Jun. 15, 1999

[54] METHOD AND APPARATUS FOR ASSIGNING A PLURALITY OF WORK PROJECTS

[75] Inventor: George A. Kocur, Arlington, Mass.

[73] Assignee: GTE Laboratories Incoporated, Waltham, Mass.

[21] Appl. No.: 08/828,867

[22] Filed: Mar. 31, 1997

Related U.S. Application Data

[63] Continuation of application No. 07/693,502, Apr. 30, 1991, abandoned.

[51] Int. Cl.[6] .................................................. G06F 17/60
[52] U.S. Cl. .................................. 705/9; 705/11; 705/32; 364/468.07
[58] Field of Search ................................ 705/9, 8, 7, 11, 705/10, 32; 345/963; 364/468.06, 468.07, 468.08; 434/108

[56] References Cited

U.S. PATENT DOCUMENTS

| | | | |
|---|---|---|---|
| 3,593,008 | 7/1971 | Dewitt et al. | 235/151 |
| 4,700,295 | 10/1987 | Katsof et al. | 364/401 |
| 4,819,162 | 4/1989 | Webb, Jr. et al. | 364/401 |
| 5,070,453 | 12/1991 | Duffany | 364/402 |
| 5,093,794 | 3/1992 | Howie et al. | 364/468 |
| 5,111,391 | 5/1992 | Fields et al. | 364/401 |
| 5,117,353 | 5/1992 | Stipanovich et al. | 367/401 |
| 5,155,679 | 10/1992 | Jain et al. | 364/402 |
| 5,216,593 | 6/1993 | Dietrich et al. | 364/402 |
| 5,406,476 | 4/1995 | Deziel, Jr. et al. | 364/402 |

OTHER PUBLICATIONS

"People–Planner Scheduler", Imformation Marketing Businesses, Inc. 1987.
"Expert Systems for Planning and Scheduling Manufacturing Systems" European Journal of Operational Research 34 (1988) 113–128, Kusiak et al.
Hoop et al, "Matching the Skills to the Work of Engineers and Scientists" ©1984.
Franz, et al.: "Scheduling Itinerant Family Planning Personal . . . ", Proc. of 16th Ann. Meeting of Amer. Instit. of Decision Sci., had Nov. 5–Jul. 1984, Abstract provided only.
McConville: A Heuristic Model for Scheduling Repriman to Jobs . . . Master's Thesis, Published May 27, 1980. Abstract provided only.

*Primary Examiner*—Joseph Thomas
*Attorney, Agent, or Firm*—Leonard C. Suchyta; Floyd E. Anderson

[57] ABSTRACT

An apparatus and computerized method of assigning workers to a plurality of work-projects, utilizing linear programminig is disclosed. The linear programming formulations forecast the adequacy of the workforce, assigning workers so as to maximize scheduling of appointments while minimizing the aggregate travel time of workers to reach the work-project sites.

6 Claims, 5 Drawing Sheets

METHOD AND APPARATUS FOR ASSIGNING A PLURALITY OF WORK PROJECTS

This application is a continuation of application Ser. No. 07/693,502 filed on Apr. 30, 1991, now abandoned.

RELATED APPLICATIONS

The present invention is related to four co-pending applications filed on Apr. 30, 1991, which are incorporated into this application by reference. The related applications are:

AUTOMATED WORK ADMINISTRATION SYSTEM, Ser. No. 07/694,228, now abandoned;

METHOD OF MECHANIZING A WORK ADMINISTRATION SYSTEM, Ser. No. 07/694,330, now abandoned;

METHOD OF MANAGING AN AUTOMATED WORK ADMINISTRATION SYSTEM, Ser. No. 07/694,537, now abandoned;

HAND-HELD TERMINAL INTERFACE FOR AN AUTOMATED WORK ADMINISTRATION SYSTEM, Ser. No. 07/712,391, now abandoned.

TECHNICAL FIELD OF THE INVENTION

The present invention relates generally to automated operation systems, and more specifically to a computer apparatus and method for automatically accumulating, routing, assigning, dispatching and recording the work of personnel having responsibilities in various work-project functions.

BACKGROUND OF THE INVENTION

Increased productivity and cost reduction continue to be significant objectives for organizations in an increasingly competitive marketplace. Those objectives are even more critical in work environments which are labor intensive. Consequently, in recent years businesses have automated more of these labor intensive activities. Examples include word processing, computer-aided manufacturing and automated inventory control systems, to name a few.

In the field of telecommunications particularly, this activity has intensified due to a changed operating environment from that of a regulated service to one in which there now is open competition. To remain competitive in the industry and still effectively control the massive telecommunications network, telephone operating companies have automated substantial portions of their record keeping, order processing and equipment maintenance activities.

Even though those separate functional activities have been mechanized to improve work efficiency, there are numerous operations utilizing a combination of such mechanized systems which still continue to rely heavily on manual procedures. One such area is the operation by which craftspersons are dispatched to the field, for example, to install new telephones, to maintain already-installed systems, or to troubleshoot and repair defective equipment.

Present manual dispatch procedures are outdated, labor intensive and paper driven. In these prior art operations, order activity received from a mechanized service order record keeping system is assigned manually and then routed to field forces using geographic grid numbers. Assignments are batched based on work units and skill levels.

Trouble reports, which are received from a mechanized trouble reporting system, are assigned one at a time based on commitment, appointment, and trouble condition. Here again, geographic grid numbers are utilized to reduce driving time. As the work force calls in to clear their current trouble assignment, a clerk requests a new assignment from a dispatcher. Due to the sequential nature of the process, delays are often encountered, resulting in lost time for the work force.

Additionally, work completion data is recorded on multiple documents and entered into multiple bookkeeping systems, e.g., service order record keeping system, trouble administration system, time sheets, and payroll by the dispatch clerk. This duplication of effort is not only time consuming, but could result in recording inconsistent data. The work force loses productive time as they wait for the clerk to complete the required documentation. Further, the reports produced from these entries also require reconciliation time.

Due to the manual nature of the process, it is difficult to monitor and track time commitments. Hence, there is an increased chance that potential conflicts are not recognized early enough to remedy a problem. Oftentimes, this results in missed commitments.

This manual process does not easily permit consolidation or adjustment to handle changes in work volume. Further, utilizing these procedures, the dispatch process becomes very intuitive rather than mathematically sound. Thus the efficiency of the dispatch process is directly related to the skill and expertise of the dispatcher. What is needed is an automated system which administers and controls those related work functions by integrating them into a unified work process, and dispatches assignments in a nearly optimal and consistent manner.

OBJECTS OF THE INVENTION

Accordingly, it is a primary objective of the current invention to obviate the above noted and other disadvantages of the prior art.

It is a further object of this invention to provide a novel method of efficiently assigning workers to work-projects.

It is a still further object of this invention to assign workers to work-projects consistent with priorities so as to comply with time-commitment requirements of the work-projects.

It is a yet further object of the present invention to forecast the adequacy of the work force for servicing expected work-projects.

It is a further object of the invention to cluster a worker's schedule of work-projects so as to reduce travel time, and promote efficient scheduling.

SUMMARY OF THE INVENTION

The Automated Dispatch System (ADS) which is implemented in EL computer system coordinates and addresses the assignment of workers to a set of work-projects that must be completed. In mathematical terms, the solution to this formulation is known to be an NP-complete problem; it is a generalization of the travelling salesperson problem. As a result, it is unlikely that a polynomial algorithm exists to solve it optimally. The Automated Dispatch System splits the problem definition into two separate formulations, each of which can be solved optimally. While this segmentation does not guarantee that the solution is optimal for the combined problem, it is a practical approach to obtaining good solutions.

The first formulation is addressed with a linear programming method that clusters the work to be dispatched around the workers who can do it. It is a capacitated clustering, approach, recognizing the work capacity of each worker. It considers skills, work locations, union rules, and related issues in full detail. This step does not consider the detailed timing of the worker's schedules when executing. However, it does check that the worker is on duty during the hours that a specific piece of work must be accomplished and that there is sufficient time remaining to do the work.

The second half of the formulation is addressed with a heuristic. This is essentially a travelling salesperson problem. Once the linear program has allocated the work-projects to the workers, a typical worker has a trial route of approximately 8 work-projects.

The Automated Dispatch System solves this NP-complete problem by ignoring detailed timing constraints in the linear programming, considering only approximate timing. Detailed route construction is considered in a subsequent step. If time windows are not restrictive, the decomposition of the overall problem into two portions is likely to be nearly optimal, because the time window constraints would not bind in the linear programming step and would thus not change the solution.

There are further advantages to the decomposition of the formulation as implemented in the Automated Dispatch System. The dispatch method accomplishes 'fractional' work-project assignment. This occurs most frequently for large work-projects, in which partial assignments are allowed. For example, it is permissible to start a 5 hour work-project in the afternoon one day, returning the next day to complete it. This feature of the system hinders its exact formulation as an integer programming problem, and is difficult to handle in a single linear programming formulation. The decomposed approach utilized in the Automatic Dispatch System handles it in an efficient manner.

Although the formulation is separated into two stages conceptually, it is implemented in multiple steps, three of which are linear programming steps.

One aspect of the current invention comprises the following major steps:

A projecting step in which both actual and forecasted work are allocated to workers to establish whether the workforce is adequate to cover the work-projects. This is a linear programming step that utilizes a graph associating each worker with work-projects that can be accomplished by the worker.

A balancing step in which only actual work-projects is matched to available workers; any work in excess of what can be performed by the workers is deferred. This again is a linear programming step.

A clustering step in which the work that will be completed (based on the results of the balancing step) is clustered around each worker's work location. This is the first step in developing actual routes; its output is a trial assignment of work-projects for each worker. This is the third linear programming step.

A work ordering step in which the best order is determined for each worker's work. This step utilizes a 'two-optimal' heuristic.

A local improvement step in which work missing appointments or commitments can be swapped among workers. This is a heuristic step that uses similar logic to the 'two optimal' step above; it also uses the linear programming graph from the first three steps.

The linear programming utilizes a specialized network simplex code. This is a transshipment code, which is more general than the problem requires. The last two steps are heuristic steps. The 'two optimal' method of the ordering phase utilizes conventional methods.

DETAILED DESCRIPTION OF THE INVENTION

For a better understanding of the present invention, together with other and further objects, advantages, and capabilities thereof, reference is made to the following disclosure in conjunction with the accompanying drawings.

Figure 1:
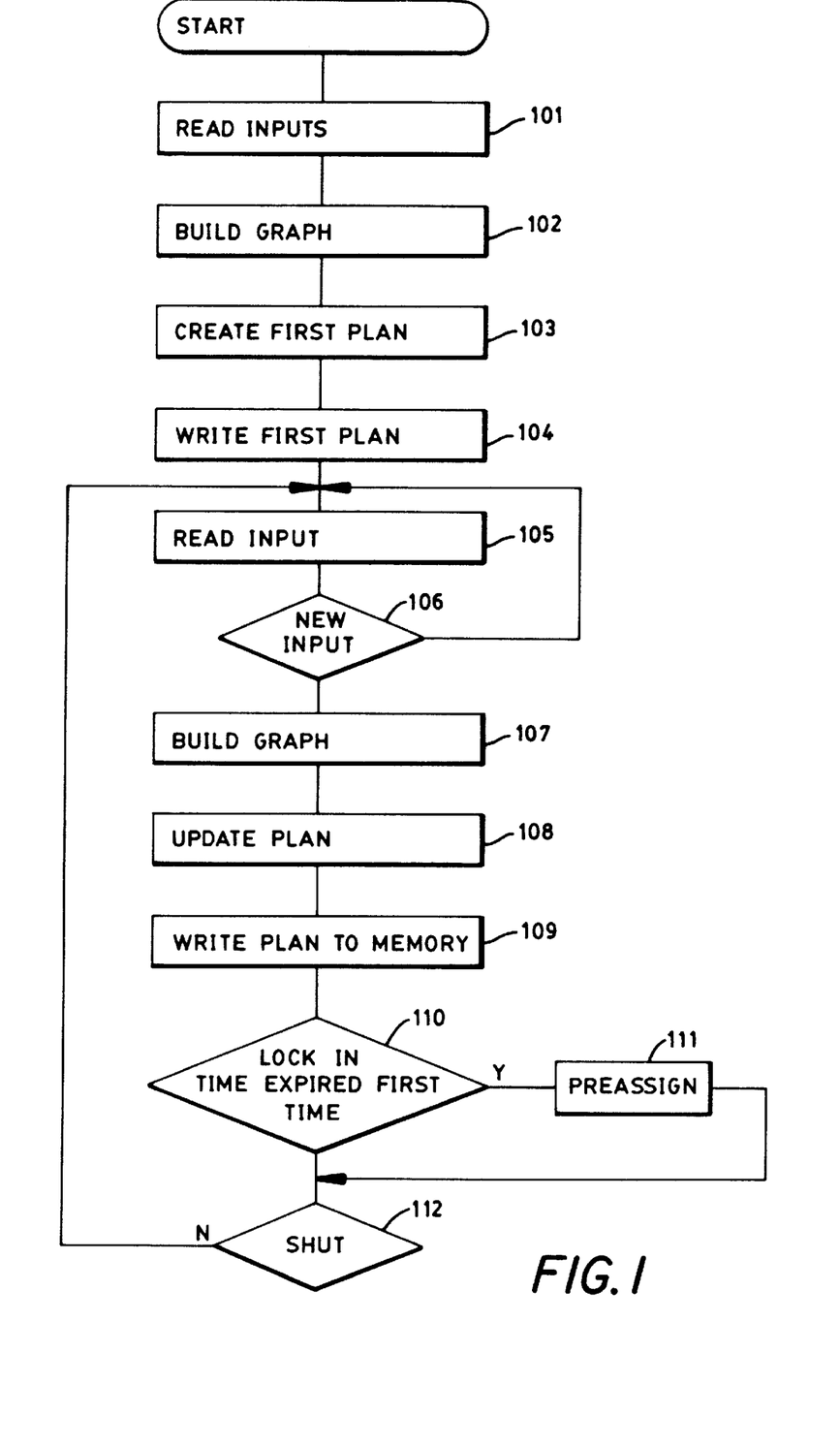
FIG. 1 is a flow chart depicting the processing of the Automated Dispatch System in which the present invention is incorporated.

Referring now to FIG. 1 wherein is depicted an information processing flow chart for the computerized Automatic Dispatch System in which the novel dispatch method is implemented. In one embodiment of the invention, the Automatic Dispatch System is implemented on computer hardware having a CPU, memory, and input and output devices. The dispatch method of the present invention is implemented in software with the "FORTRAN" and "C" computer programming languages, and executes on a VAX computer from the Digital Equipment Corporation. The source code implementing the dispatch technique of the current invention is included as Appendix A. The information processing flowchart of FIG. 1 addresses two main processing sections.

The first processing section, informational processing blocks 101, 102, 103, and 104, initializes and defines the system inputs and resolves the first plan of the day, while the second processing section, informational processing blocks 105, 106, and 107, provides for receiving additional worker and work-project input and creating an updated plan therefrom.

Addressing now the first processing section, wherein the first dispatch plan for allocating workers to work-projects is resolved. Referring to the START processing block 100, the ADS system begins operation at a time designated by the user usually in advance of the start of actual daily operations, to allow time for the first plan, to be computed and written to memory before it is actually used. Referring now to processing block 101, at the start of processing the ADS system receives inputs defining each work-project j and worker i. This input data is stored in the computer memory of the computer system. For each work-project j to be dispatched, the ADS system creates a work-project data record in computer memory. The work-project data includes a value for the standard work time or SWT(j) for the work project. The SWT defines the standard time assigned to complete the work-project. Individual workers may complete the work-project in more or less time depending on their experience and skills. For this reason, the SWT is utilized in conjunction with a value for an individual worker's productivity to project how long a particular worker will take to complete an individual work-project. Work-project data further includes a precise work-project location, a work-project priority p(j), the worker skills demanded by the work-project, and a time commitment window. This window describes the period in time in which the work-project is to completed. The calculation of this window is based on internal and regulatory commitment requirements and appointment schedules that have been previously arranged with customers. The window concept unifies commitment and appointment times for the method. The system will calculate the end of the dispatch window as the end of the appointment or commitment less SWT invariance.

To facilitate the forecasting of the day's work-projects, the system permits the input of a forecast work load for the day. Early in the day, when only a few work projects have come into the system, the system is able to adjust the current work load and predict situations where dispatch windows may be missed due to few workers or an unusually high work load. Clearly, no forecasted work-projects are actually dispatched by the system.

The system also receives data for each worker i, and creates EL worker data record in computer memory. This data record includes a start and end time for regular and overtime shifts, an individual worker's productivity factor, a primary and secondary work group, work type assignments, time periods for which the worker is unavailable due to meetings, doctor's appointments, lunch, etc. Worker data further includes a preferred worker location which defines the geographical area in which a worker is preferred to work, and a work center which defines the geographical limits in which the worker can work.

The primary and secondary work groups define the work-projects for which a worker is eligible to work. The system will assign workers to work in either their primary or secondary assignments as needed.

The work group defines differing segments of the business operation. Using the telephone industry as an example, work groups can be formed to address the needs of cable operations, public coin telephones, the central office, private branch exchanges, and single line business in residence operations. A work type within work group is defined in the system specifying worker qualifications. Continuing the telephone industry example, it is generally agreed that it is more difficult to work repairing existing phones than installing new equipment. For this reason the more experienced workers are assigned to repair work, whenever possible. A worker qualified for repair may however also be competent to work installation of new equipment. The system, in assigning workers to work-projects, matches the qualifications of workers with the work-project demands.

A further input to the system is a value defining the lock-in-time. This is the time after which the first work-project of the day will be fixedly assigned to a worker. While new work-projects may be continually entered into the system, once the lock-in-time has expired the first work project of the day for that current plan is determined and fixed for each worker. This aspect of the invention facilitates the assignment of the first work-project of the day in that the assignments can be delivered to worker's mailboxes eliminating worker inquiries. Additionally a standard travel time is input for each worker's office. This speed is utilized to predict the time to travel to a work location.

Referring now to information processing block 102 which builds a linear programming graph for use in subsequent steps.

The efficient allocation of workers to work projects is a network flow formulation which can be represented as a graph. The worker data records are viewed as sources of flow and the work-project data records are sinks. The flow units are workers hours. For example, each worker on a typical day can provide eight hours of flow. An average piece of work for a work-project may absorb one hour of flow. Because the problem can be formulated as a network flow case it can be solved using a specialized network simplex approach. This is a state of the art variant of linear programming which executes very quickly for problems which can be cast in the appropriate data structure. Thus when the problem can be formulated as a graph, recent advances in computer science may be used to efficiently represent the problem. The network simplex approach is known to those of ordinary skill in the art and is similarly described in an article by Bradley, Brown, Graves in Management Science, 24(1) 1977, pp 1–34.

The Automated Dispatch System builds a graph and associated data structures during its first execution of the day in processing block 102. Subsequent dispatch executions create a new graph when incorporating new work-project and worker information. Associated with each work-project data record is a work-project node. Similarly, each worker data record has an associated worker node record. The graph links a work-project data record to its associated work-project node and the worker data record to the worker node. Further the graph links work-project nodes with worker nodes, representing worker eligible to perform the work-project. That is, it links all work projects to each eligible worker. In order for a worker to be eligible for a work-project, the work-project and the worker must have matching work groups, work types, skills, known buildings, work centers, and the worker must be on duty during the work-project's dispatch window. Further, the worker must have enough hours left in his or her tour of duty to complete the work project, unless the work project can be split into distinct pieces. Additionally, the system allows for a manual override such that any work-project can be fixedly assigned by the dispatcher. In this case, the dispatch system will not attempt to assign the work-project but rather will use the dispatcher's assignment.

Referring now to information processing block 103 of FIG. 1. wherein the initial plan for the day is determined. In determining the dispatch plan, the mathematics of linear programming is utilized. The details of this processing block and the linear programming formulation are later disclosed in this application. Having determined the first plan of the day, the plan is saved in computer memory as depicted in processing block 104. If no further inputs of work-project data records or worker data records have been received, the system enters a quiescent state, waiting for additional input, processing block 105 and processing block 106.

Referring now to the second processing section of FIG. 1, comprising process blocks 106 to 112. This processing section is executed as new inputs dictate that an updated plan be created. Referring to processing block 106 new input data is received into the system. This new input may be in the form of a new work-project to be accomplished, the completion of work-projects, or changes in worker availability. Referring to process block 107, the linear programming graph described above is modified to reflect these changes. In information processing block 108 an updated dispatch plan is created, reflecting the changes. The details of the dispatch method will be described later in the specification. The update plan is save in the memory of the computer, as shown in process block 109.

Referring now to information processing block 110. Having created an updated dispatch plan in information processing block 108, the Automatic Dispatch System queries whether the lock-in-time has expired for the first time. As depicted in process block 111, if the lock-in-time has expired for the first time, each worker's first work-project of the day is fixed and preassigned to that worker. As was stated above, no subsequent input of work-projects will change this first assignment. The details of this assignment are later described in the application. If the lock-in-time has not expired, a determination is made as to whether system shutdown is being requested, process block 112, and if so processing terminates. If otherwise, the Automatic Dispatch System returns to information processing block 105 awaiting further input.

Figure 2:
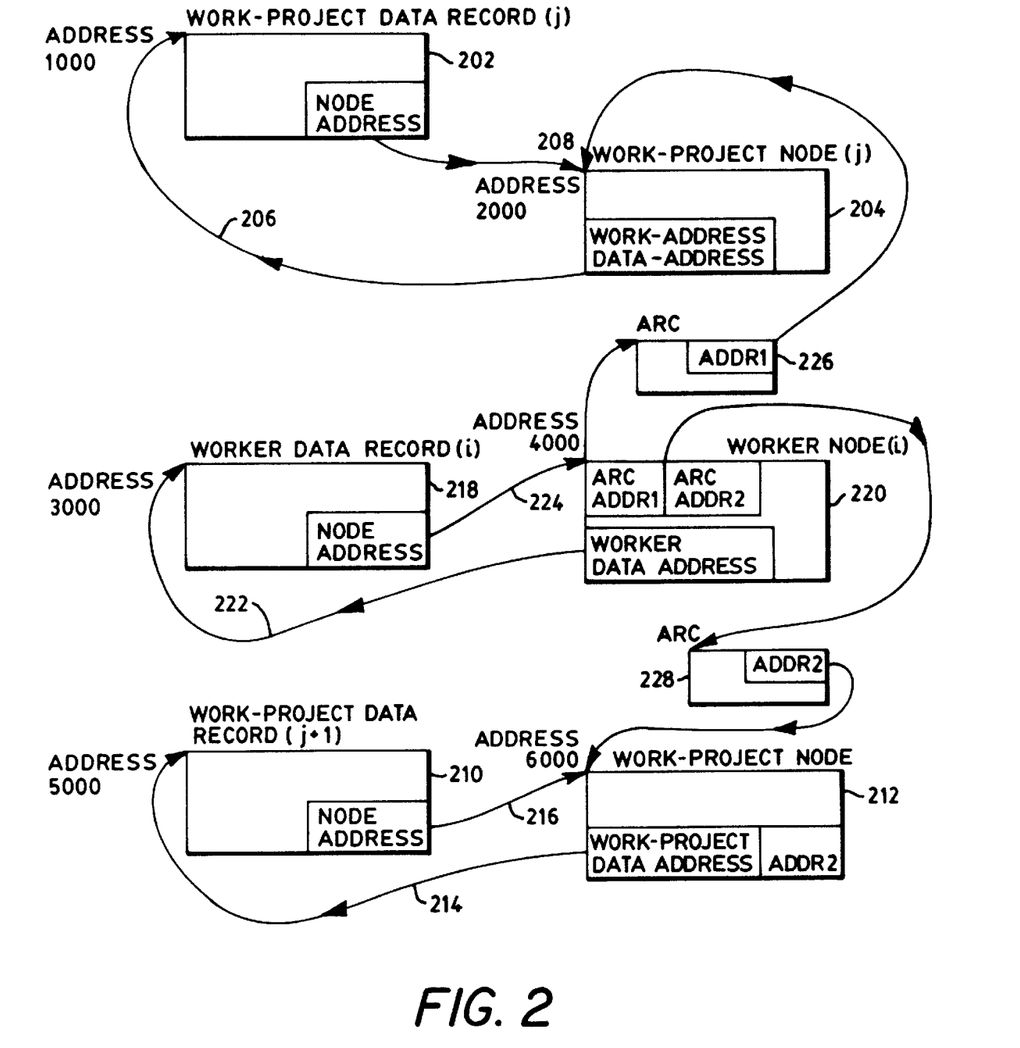
FIG. 2 is a diagram depicting the data structure and connecting arcs associating the worker data record to an associated work-project data record.

Referring to FIG. 2, each work-project data record has an assigned address within the memory of the computer system. In FIG. 2, work-project data record 202 is for example assigned memory address 1000 and work-project data record 210 is assigned memory address 5000. It will be obvious to one of ordinary skill in the art that the memory assignments depicted are for exemplary purposes only. Associated with each work-project data record is a work-project node which are numbered in a sequential manner from 2 to n. Work-project data record 202 is assigned memory location 1000, and its corresponding work-project node 204 is assigned memory location 2000. The address of the work-project data record 202 is stored in the WORK-PROJECT DATA ADDRESS field of the work-project node 204. Further, the address of the work-project node is stored in the NODE ADDRESS field of work-project data record 202. The address links describe links 206 and 208, mutually connecting the work-project data record 202 with the work-project node 204. Likewise, associated with work-project data record 210 is a work-project node 212 which is assigned memory location 6000. The address of the work-project data record 210 is stored in the WORK-PROJECT DATA ADDRESS field of the work-project node 212. Further, the address of the work-project node is stored in the NODE ADDRESS field of work-project data record 210. Again links 214 and 216, implemented as address pointers, connect the work-project data record 210 with work-project node 212.

For each worker defined to ADS, a worker data record 218 is created. Associated with each worker data record is a data structure defined as a worker node 220, numbered from n+1 to m. Similar to what was described for the work-project data record above, the address of the worker data record is stored in the WORKER DATA ADDRESS field of the work node 220, creating a link 222 from the worker data record 218 to the worker node 220. Conversely, the address of the worker node 220 is stored in the NODE ADDRESS field of worker data record 218, creating a reverse link 224.

Since all workers cannot work all work projects j due to skill requirements or other limitations described above, a graph is constructed in which an arc, a data structure connecting node data structures via address pointers is built. Further, an arc defines a capacity and cost associated with the nodal connection. Still referring to FIG. 2, an arc is built from the worker node to the work-project node i to j if the worker can work the work-project. An arc is implemented in the ADS system as an intermediate data structure, connecting two nodes. As is shown in FIG. 2, worker node 220 is eligible to perform work-projects 204 and 212, and thus arcs 226 and 228 connect the associated data structures. There is an arc from each worker node to each work-project node for which a worker is eligible to perform. Otherwise an arc is not created.

Figure 3:
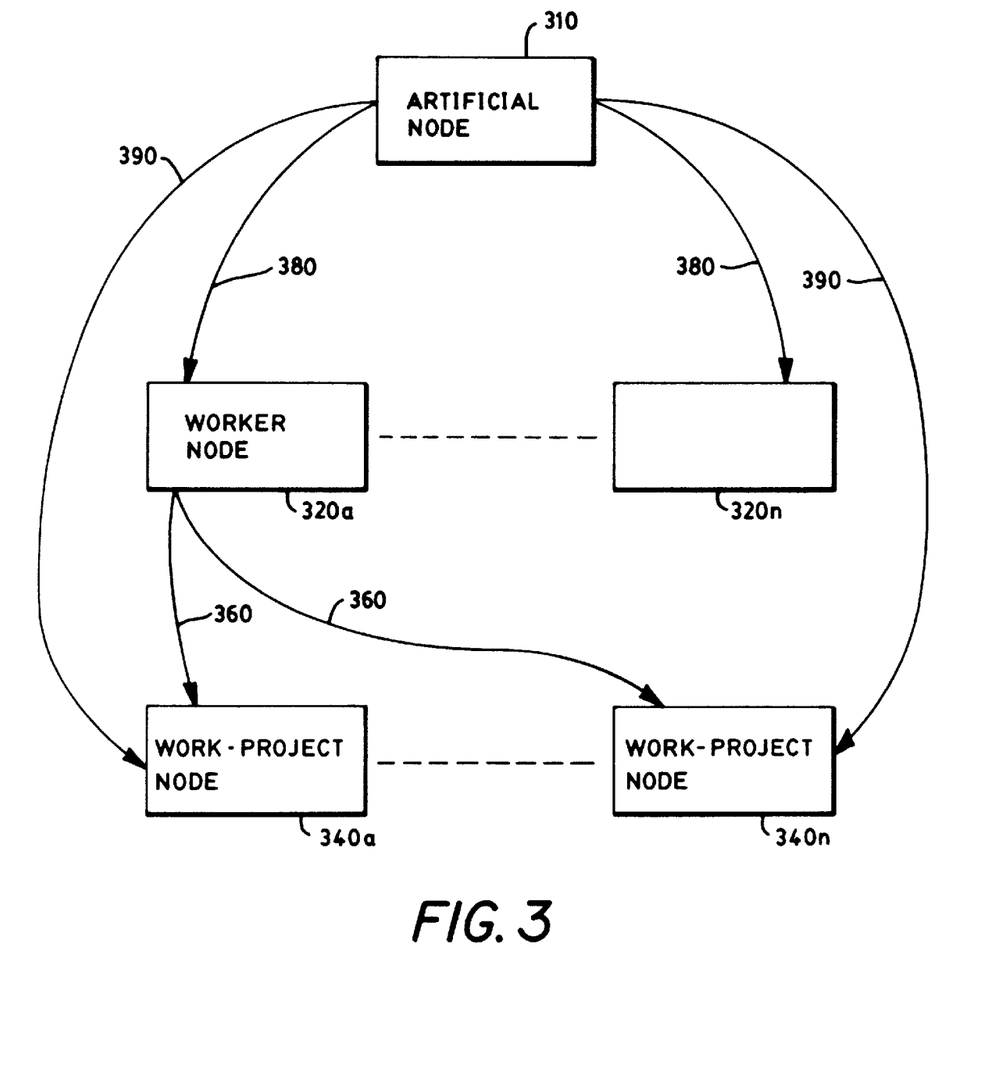
FIG. 3 is a diagram depicting the arc structure for the artificial node, the worker node, and the work-project node.

Referring to FIG. 3, further describing the build graph function. An artificial node 310 is created as node number 1. The artificial node will be the starting basis for each of the solutions for the linear programming formulations. As was described previously, a worker node 220 is created for each worker data record 218. In FIG. 3, the worker nodes are shown as 320*a* through 320*n*. A work-project node 204 is also created for each occurrence of a work-project data record 202. The work-project nodes are shown as 340*a* through 340*m*. An arc, shown as 360, connects each worker node to each work-project node the worker is eligible to work. Each arc 360 has associated with it both a capacity and cost. For an arc from a worker node to a work-project node the capacity is the SWT(j) adjusted for worker productivity and the cost is the priority p(j) of the work-project or the travel time t(i,j) depending on the linear programming formulation to be described later. Further arcs connect the artificial node to each worker and work-project node. In FIG. 3, the arcs 380 and 390 depict an arc from the artificial node 310 to an occurrences of a worker node 320*a* and from the artificial node 310 to an occurrence the work-project node 340*a*. Arc 380, connecting the artificial node 310 with an occurrence of a worker node 320*a* has an assigned capacity of worker hours available and a cost of zero. Arc 390, connecting the artificial node 310 with an occurrence of a work-project node 340*a* has an assigned capacity of infinity (a very large number in a computer system) and cost of negative infinity (a very large negative number in a computer system).

Figure 4:
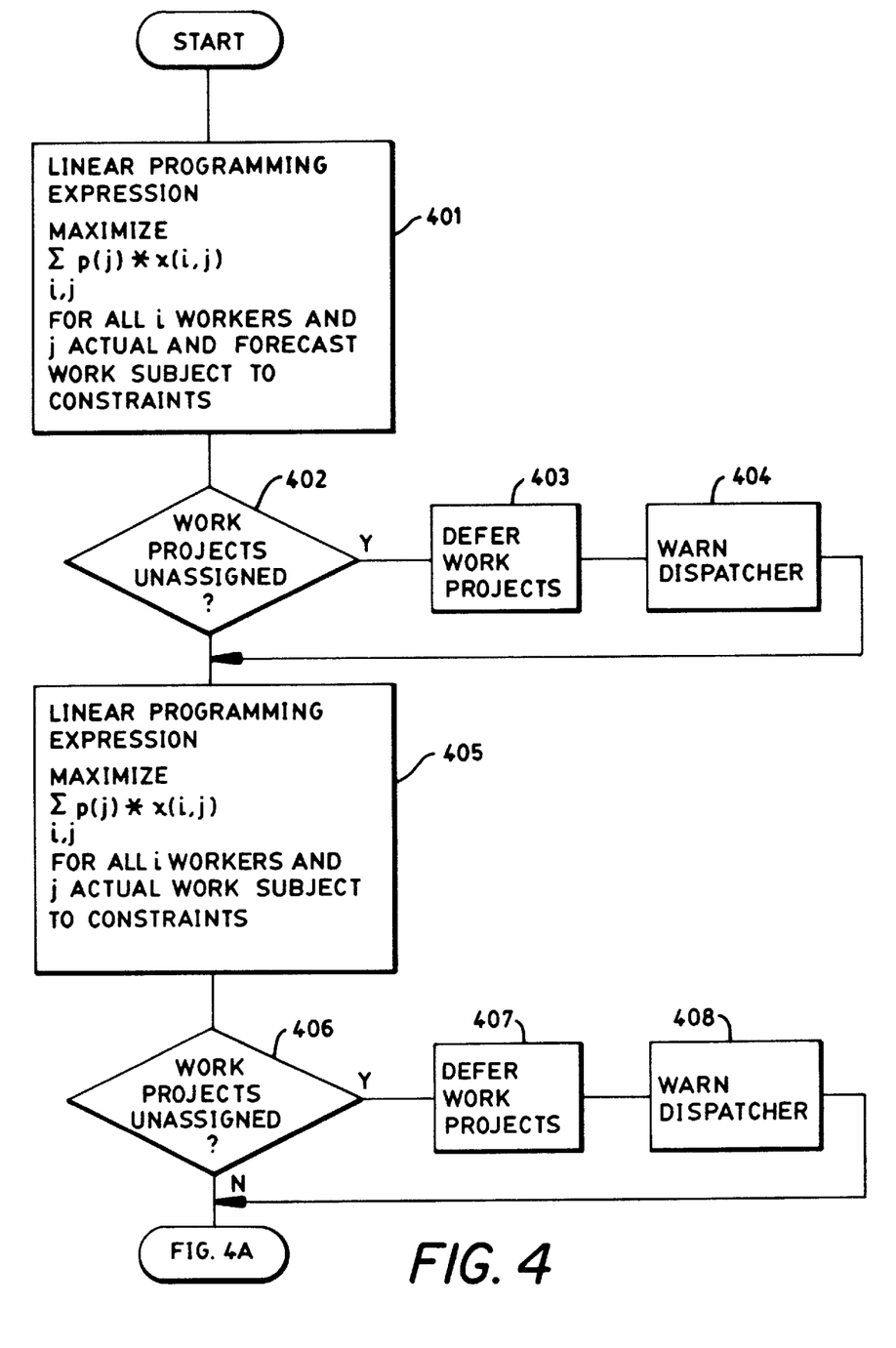
FIGS. 4 and 4A are flow charts depicting the processing of the current invention for the assignment of workers to work-projects.

The details of the linear programming formulation, pertaining to informational processing blocks 103 and 108 will now be described. Referring to FIG. 4, wherein the processing flow describing the allocation or assignment of workers to work-projects is depicted.

Utilizing the constructed graph, linking worker nodes and eligible work-project nodes, an initial linear programming problem is formulated and resolved. Referring to process block 401, using both the forecast and actual work outstanding, the dispatcher initially attempts to flow the longer and high priority work-projects to workers subject to their availability. Mathematically, the linear programming formulation can be represented as follows:

maximize the value of the expression $$\sum_{i,j} p(j) * x(i, j) \text{ for all } i, j$$

subject to the constraints $$\sum_{j} x(i, j) \leq h(i) \text{ for all } j, \text{ and fixed } i$$

$$\sum_{i} x(i, j) \leq SWT(j) \text{ for all } i, \text{ and fixed } j$$

x(i,j)≧0 for all i,j in the set G.
x(i,j)=0 for all i,j not in G
x(i,j)=SWT(j) for all i,j for the set of manually assigned
    work-projects (overridden by an operator)=M1
x(i,j)≧0 for all i,j in G
x(i,j)=0 for all i,j not in G x(i,j)=SWT(j) for all i,j in M1

$$\sum_{M(j)} x(i, j) = SWT(j) \text{ for } j \text{ in } M2, i \text{ in } M(j)$$

$$\sum_{N(j)} x(i, j) = SWT(j) \text{ for } j \text{ in } M3, i \text{ in } N(j)$$

$c_{ik} = c_j$      for some $k$ $e_{ik} = e_j$      for some $k$ $g_{ik} = g_j$      for some $k$ $s_{ik} = s_j$      for some $k$ $b_{ik} = b_j$      for some $k$ $h_i >= w_j$      if $w_j <= W$ $t_{j2} - t_{i1} >= w_j$      if $t_{j2} < t_{i2}$;

$t_{i2} - t_{j1} >= w_j$      otherwise where

| | |
|---|---|
| $c_{ik}$ | is the kth work center in which worker i can work |
| $c_j$ | is the work center associated with work-project j |
| $e_{ik}$ | is the kth work type which worker i can work |
| $e_j$ | is the work type of work-project j |
| $g_{ik}$ | is the kth work group which worker i can work |
| $g_j$ | is the work group of work-project j |
| $s_{ik}$ | is the kth skill which worker i can work |
| $s_j$ | is the skill associated with work-project j |
| $b_{ik}$ | is the kth building in which worker i can work |
| $c_j$ | is the building associated with work-project j |
| W | is the minimum length of work-project that can be split or partially worked |
| $t_{i1}$ | is the earliest time worker i is available to be assigned to a work-project |
| $t_{i2}$ | is the latest time worker i is available to be assigned to a work-project |
| $t_{j1}$ | is the earliest time work-project j can be worked |
| $t_{j2}$ | is the latest time work-project j can be worked |

M1 is the set of work-projects manually assigned (overridden) by the dispatcher to a specific worker on a specific day M2 is the set of work-projects manually assigned (overridden) by the dispatcher to a specific worker, but not on a specific day M(j) is the set of arcs from the manually assigned worker to the work-project, possibly on different days M3 is the set of work-projects manually assigned (overridden) by the dispatcher to a specific day, but not to a specific worker N(j) is the set of arcs from valid workers to the overridden work-project, on the manually assigned day where p(j) is the priority for accomplishing a work-project j, x(i,j) is the duration of work-project j for worker i, G is the graph representing feasible assignments of workers i to work-project j.

As was described earlier, a large fraction of the dispatched work is repair work, which requires a rapid response, it is often the case that the work in hand at any point in time does not appear to be sufficient to occupy the work force. However, experience suggests that enough trouble reports will be received during the remainder of the day to utilize all available time. Thus, this process includes forecasted work as a 'place-holder' and stabilizer of the plan.

Since the linear program is executed with both actual and forecasted work for the day, and the location and exact time of the forecasted work is not known, preparing exact work assignments is not feasible at this juncture. However, this linear programming step does flow hours from workers to the highest priority work-projects. (The forecasted work often has high priority, especially if it is repair work.) The solution to this problem may show that no hours flow to some of the work in hand, even if there appear to be excess workers at the current time. Thus, even though some of the work in hand is assigned to workers currently, it is quite likely that it will be deferred as higher priority repair work comes in during the day.

It is also possible that either some actual or forecast work has no hours flowing to it. This indicates that the work force cannot address the projected work-projects. As indicated in process blocks 402, 403, and 404, the unassigned work is deferred, and the computer operator is warned. This alerts the dispatcher that extra personnel should be brought in.

In general, this initial procedure is a personnel planning step. It has no direct impact on the dispatch plan. If this step were not executed, the dispatcher would have to make a difficult judgment about the adequacy of the work force. The output of this step is a series of indicators on the expected utilization of the workforce.

Referring to information processing block 405 of FIG. 4, wherein a second linear programming program is executed. In this execution of the linear programming program, forecast work is not included. Thus j work-projects include only actual work-projects. Again mathematically, the linear programming formulation can be represented as follows:

maximize the value of the expression $$\sum_{i,j} p(j) * x(i, j) \text{ for all } i, j$$

subject to the constraints $$\sum_j x(i, j) \leq h(i) \text{ for all } j, \text{ and fixed } i$$

$$\sum_i x(i, j) \leq SWT(j) \text{ for all } i, \text{ and fixed } j$$

$x(i,j) \geq 0$ for all i,j in G $x(i,j) = 0$ for all i,j not in G $x(i,j) = SWT(j)$ for all i,j in M1

$$\sum_{M(j)} x(i, j) = SWT(j) \text{ for } j \text{ in } M2, i \text{ in } M(j)$$

-continued $$\sum_{N(j)} x(i,j) = SWT(j) \text{ for } j \text{ in } M3, i \text{ in } N(j)$$

| | |
|---|---|
| $c_{ik} = c_j$ | for some $k$ |
| $e_{ik} = e_j$ | for some $k$ |
| $g_{ik} = g_j$ | for some $k$ |
| $s_{ik} = s_j$ | for some $k$ |
| $b_{ik} = b_j$ | for some $k$ |
| $h_i >= w_j$ | if $w_j <= W$ |
| $t_{j2} - t_{i1} >= w_j$ | if $t_{j2} < t_{i2}$; |
| $t_{i2} - t_{j1} >= w_j$ | otherwise | where

| | |
|---|---|
| $c_{ik}$ | is the kth work center in which worker i can work |
| $c_j$ | is the work center associated with work-project j |
| $e_{ik}$ | is the kth work type which worker i can work |
| $e_j$ | is the work type of work-project j |
| $g_{ik}$ | is the kth work group which worker i can work |
| $g_j$ | is the work group of work-project j |
| $s_{ik}$ | is the kth skill which worker i can work |
| $s_j$ | is the skill associated with work-project j |
| $b_{ik}$ | is the kth building in which worker i can work |
| $c_j$ | is the building associated with work-project j |
| W | is the minimum length of work-project that can be split or partially worked |
| $t_{i1}$ | is the earliest time worker i is available to be assigned to a work-project |
| $t_{i2}$ | is the latest time worker i is available to be assigned to a work-project |
| $t_{j1}$ | is the earliest time work-project j can be worked |
| $t_{j2}$ | is the latest time work-project j can be worked |

M1 is the set of work-projects manually assigned (overridden) by the dispatcher to a specific worker on a specific day M2 is the set of work-projects manually assigned (overridden) by the dispatcher to a specific worker, but not on a specific day M(j) is the set of arcs from the manually assigned worker to the work-project, possibly on different days M3 is the set of work-projects manually assigned (overridden) by the dispatcher to a specific day, but not to a specific worker N(j) is the set of arcs from valid workers to the overridden work-project, on the manually assigned day where p(j) is the priority for accomplishing a work-project j, x(i,j) is the duration of work-project j for worker i, G is the graph representing feasible assignments of workers i to work-project j.

This is a preparatory step to the actual assignment of work-projects to workers. Its function is to identify and defer any work in hand that exceeds the capacity of the work force. The priority of work is the criterion used in making the deferral decision. Typically, only very low priority work is deferred, most of which is optional.

However, in cases when a major amount of unexpected repair is received, classes of work with higher priorities may need to be delayed. One cannot simply work from the lowest priority work-projects upward, deferring enough work until total work hours and total worker hours balance, because there may be workers who cannot work high priority work-projects due to skill limitations. Deferring low priority work-projects indiscriminately may actually leave some workers with insufficient work. The linear program accounts for all these issues.

The output of processing block 405 of FIG. 4 is a modified network graph with unassigned work-projects deferred and is used as an input to a subsequent step. In particular, deferred work-projects are excluded from this graph. As is shown in process blocks 406, 407, and 408, work-projects that have not been assigned are deferred and the dispatcher warned.

At this point in time in the method, worker hours have been allocated to work-projects in order to determine the adequacy of the work force to perform the work. to achieve a rough balance. The Automated Dispatch System has deferred low priority work-projects that cannot be performed. However, the system has not considered the location and detailed timing of the work-projects. The remaining steps address these considerations in developing the dispatch plan.

Figure 4A:
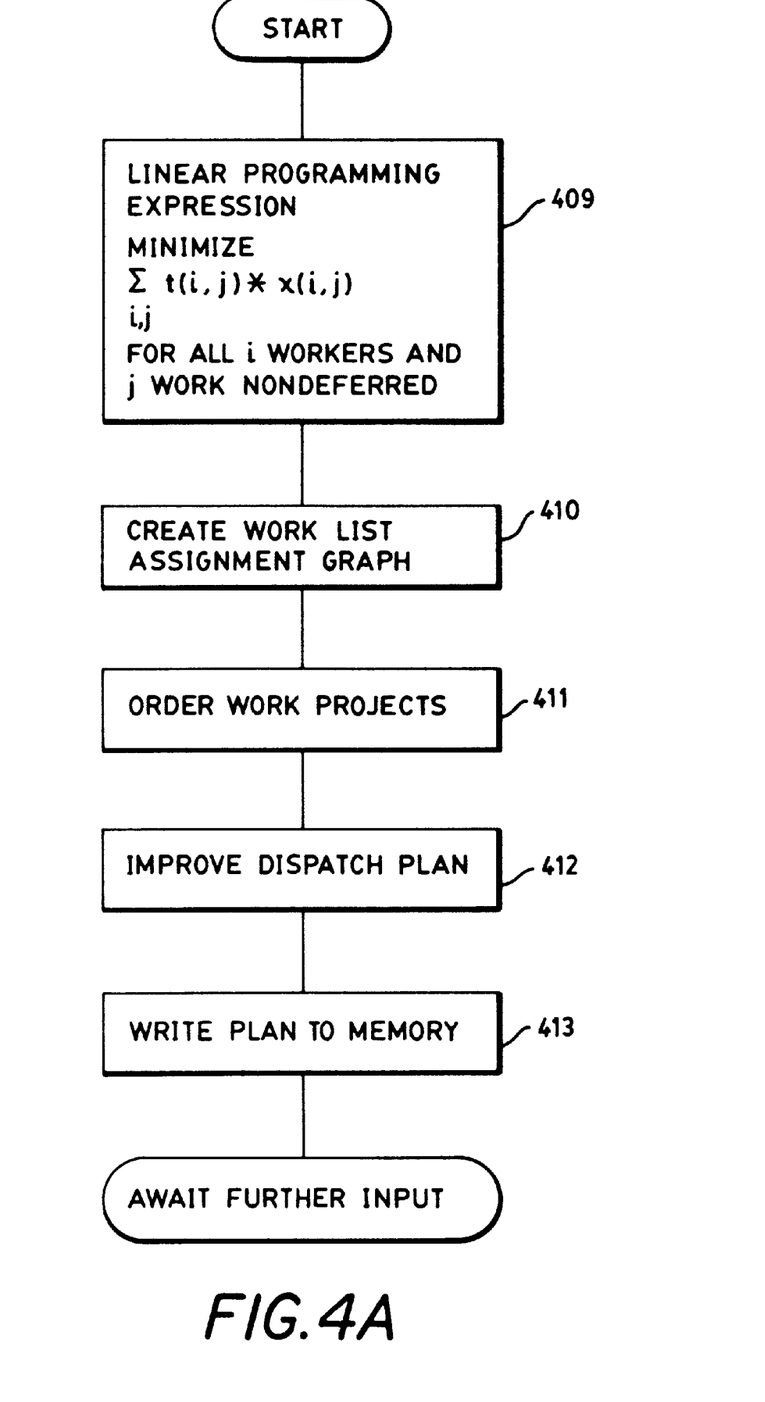

Referring now to FIG. 4a which is a continuation of FIG. 4, and in particular processing block 409 of FIG. 4a wherein a third linear programming step assigns specific work-projects to a worker utilizing a distance and travel time minimizing technique. This step considers the location of travel time minimization as the objective. This step considers the location of work-projects in addition to the other constraints considered previously. However, the step does not; consider the time window in which the work-project is required to be accomplished.

As shown in processing block 409, the linear programming formulation is identical to the above expressions except the priority measure p(j) is replaced by a travel time measure t(i,j) in the objective function, and the expression is minimized rather than maximized. This feature permits the usage of the same graph as in the two previous linear programming steps, with only the cost measure on the arcs being different. Mathematically:

minimizing the value of the expression $$\sum_{i,j} t(i,j) * x(i,j) / SWT(j) \text{ for all } i,j$$

subject to the constraints $$\sum_j x(i,j) \leq h(i) \text{ for all } j, \text{ and}$$

$$\sum_i x(i,j) \leq SWT(j) \text{ for all } i, \text{ and fixed } j$$

x(i,j)≦SWT(j) for all i, and fixed j
x(i,j)≧0 for all i,j in G x(i,j)=0 for all i,j not in G
x(i,j)=SWT(j) for all i,j in M1

$$\sum_{M(j)} x(i, j) = SWT(j) \text{ for } j \text{ in } M2, \ i \text{ in } M(j)$$

$$\sum_{N(j)} x(i, j) = SWT(j) \text{ for } j \text{ in } M3, \ i \text{ in } N(j)$$

$$x(i, j) = 0 \text{ for all } i, j \text{ in } M4.$$

$c_{ik} = c_j$      for some $k$
$e_{ik} = e_j$      for some $k$
$g_{ik} = g_j$      for some $k$
$s_{ik} = s_j$      for some $k$
$b_{ik} = b_j$      for some $k$
$h_i >= w_j$      if $w_j <= W$
$t_{j2} - t_{i1} >= w_j$      if $t_{j2} < t_{i2}$;
$t_{i2} - t_{j1} >= w_j$      otherwise where

| | |
|---|---|
| $c_{ik}$ | is the kth work center in which worker i can work |
| $c_j$ | is the work center associated with work-project j |
| $e_{ik}$ | is the kth work type which worker i can work |
| $e_j$ | is the work type of work-project j |
| $g_{ik}$ | is the kth work group which worker i can work |
| $g_j$ | is the work group of work-project j |
| $s_{ik}$ | is the kth skill which worker i can work |
| $s_j$ | is the skill associated with work-project j |
| $b_{ik}$ | is the kth building in which worker i can work |
| $c_j$ | is the building associated with work-project j |
| W | is the minimum length of work-project that can be split or partially worked |
| $t_{i1}$ | is the earliest tiine worker i is available to be assigned to a work-project |
| $t_{i2}$ | is the latest time worker i is available to be assigned to a work-project |
| $t_{j1}$ | is the earliest time work-project j can be worked |
| $t_{j2}$ | is the latest time work-project j can be worked |

M1 is the set of work-projects manually assigned (overridden) by the dispatcher to a specific worker on a specific day
M2 is the set of work-projects manually assigned (overridden) by the dispatcher to a specific worker, but not on a specific day
M(j) is the set of arcs from the manually assigned worker to the work-project, possibly on different days
M3 is the set of work-projects manually assigned (overridden) by the dispatcher to a specific day, but not to a specific worker N(j) is the set of arcs from valid workers to the overridden work-project, on the manually assigned day where p(j) is the priority for accomplishing a work-project j, x(i,j) is the duration of work-project j for worker i, G is the graph representing feasible assignments of workers i to work-project j. M4 are work-projects deferred in the previous linear program, and t(i,j) defines the travel time for a worker i to travel to work-project j from his preferred work location; t(i,j) is calculated using a rectilinear distance plus a percentage increment and multiplied by an office travel speed estimate.

This step results in flows from workers to work-projects that minimize the distance of the work-projects assigned to worker's preferred work location. Although this is not the same as a solution which minimizes the length of worker routes, it is quite close under typical circumstances.

For the Automated Dispatch System, a worker's preferred work location is fixed; it is based on that worker's familiarity with the physical telephone network and the geographic area, which allows higher productivity in that area than elsewhere.

The result of the step is a set of flows from worker to work-projects, which are translated into a set of work assignments for each worker. A new graph is created associating the work-projects with individual workers as indicated in processing block 410. Because some work-projects may receive nonzero flows which are not sufficient to complete it (e.g. a one hour work-project receives only 30 minutes of assigned labor) and other work-projects are divided among two or more workers, some corrections are required after completion of the step. These corrections are based on rounding and truncating the work assignments. There is some slack in each worker's day (in the Automated Dispatch System, it is typically assumed that a worker working 8 hours is satisfactorily scheduled if they receive between 7.5 and 8.5 hours of work.) In general, the system attempts to round up on fractionally assigned work-projects to make them fully assigned. If this is impossible, the work-project is dropped from the work assignment. (Large work-projects which can be split do not require this rounding operation.)

This rounding and truncation operation results in some loss of optimality. Typically, few work-projects are partially assigned. Simple rounding usually results in a good solution.

After the previous linear programming step is completed, a set of work-projects has been assigned to each worker. These work-projects are clustered around his or her preferred work location. As depicted in process block 411, the dispatch method orders the work-projects for an individual worker. This is not a standard traveling salesperson problem, in which only overall travel time must be minimized, but rather it is an extended version of the problem, since the primary objective is for workers to meet the maximum number of appointments and commitments in their schedule. Among alternative routes that meet the same number of appointments and commitments, the one with the shortest travel distance is selected.

Because each worker is typically assigned about 8 work-projects per day in the telephone industry example, the problem size is small enough that straightforward methods are implemented quickly.

The method utilized in process block 411 by the Automated Dispatch System is known as "two-optimal". This is a heuristic method for solving traveling salesperson problems. The use of "two optimal" methods in pure distance-minimizing problems are described in an article by Bodin and Golden in "Computers and Operations Research" 10(2), pp. 63–211, 1983; "two optimal" procedures are described on pp. 91–92]. In addition to the travel time measure used, the dispatch method of the current invention extends the "two optimal" procedure to examine the effects on missed completions, and the accumulated times for missed completions. A further reference on "two optimal" methods is "Discrete Optimization Algorithms with Pascal Programs" by Syslo, Deo and Kowalik, Prentice-Hall, 1983.

The method creates an initial route, which results in ordering the work-projects in deadline order, and then searches for improvements. It is known by those skilled in the art that under simplified conditions a deadline schedule is optimal. In the instant case, it is not, but it is a good starting solution. All pairs of work-projects in the route are swapped, and examined for improvements. This process terminates when all pairs have been examined and no further improvement is found.

At each time T during the day, for each worker i:

$$\text{Maximize } \sum_j (y_{1j} + y_{2j}) \quad [17]$$

subject to $$y_{1j} = 0 \text{ if } z_{1j} >= t_{1j} \quad \text{for all } j \quad [18]$$

$$y_{1j} = t_{1j} - z_{1j} \quad \text{otherwise}$$

$$y_{2j} = 0 \text{ if } z_{2j} <= t_{2j} \quad \text{for all } j \quad [19]$$

$$y_{2j} = z_{2j} - t_{2j} \quad \text{otherwise}$$

$$z_{1j} = z_{2(j-1)} + d_{(j-1)j} \quad \text{for all } j >= 2 \quad [20]$$

$$z_{2j} = z_{1j} + w_j \quad \text{for all } j \quad [21]$$

$$z_{11} = z_{20} + d_{01} \quad [22]$$

where y$_{1j}$ is the penalty if worker i arrives at work-project j earlier than the start of its time window
y$_{2j}$ is the penalty if worker i leaves (finishes) work-project j later than the end of its time window
z$_{1j}$ is the arrival time of worker i at work-project j
z$_{2j}$ is the departure (completion) time of worker i at work-project j
d$_{(j-1)j}$ is the travel time from work-project j-1 to work-project j
z$_{10}$ is the completion time of the current work-project being worked by worker i If there are multiple solutions to [17], a second problem is solved:

$$\text{Minimize } \sum_j d_{(j-1)j} \text{ for } \{j\} \text{ that are optimal for [17]} \quad [23]$$

subject to constraints [18]–[22]

After initial routes have been assigned, a route improvement process is examined, as shown in process block 412. Work-projects are considered for swapping only if an appointment or commitment is missed at this stage. The swap of work-projects between two workers is considered if it is feasible (i.e. both workers can do both work-projects, as reflected in the network graph used in the linear programs). Being feasible, a check is made to determine if it yields an improvement. A time distribution of the work assigned to each worker is computed, and work is swapped on that basis. For example, an adjustment is made to balance the workload of workers having primarily morning commitments with other workers having substantially afternoon appointments. If the swap appears to be promising, it is made on a trial basis.

All work-projects missing windows are considered for improvement at this juncture. The output of this step is a series of improvements in the work-project allocation, dispatcher warnings are given, and the dispatch plan is written to computer memory.

While there have been shown and described what are at present considered the preferred embodiments of the present invention, it will be obvious to those skilled in the art that various changes and modifications may be made therein without departing from the scope of the invention as defined by the appended claims.

What is claimed is:

1. A computer implemented method for assigning a plurality of work-projects to be performed by a plurality of workers, each work-project having specified requirements for completion of the work-project and each worker having associated therewith specified capabilities for performing said work-projects, said method comprising the steps of:

(a) receiving on a computer both actual and forecast work-project data identifying a work-project j, including the skill requirements required for said work-project, and a time-commitment for completing said work-project, (b) receiving on a computer worker data identifying a worker i, including skill set for said worker and the hours available h(i) for said worker, (c) producing on a computer a first assignment of a work-project using linear programming to one of said workers by matching the skill requirements of each actual and forecast work-project with the skill set for said worker, and limiting the hours of said worker i to less than or equal to h(i), (d) deferring each work-project not assigned in step (c), (e) producing a second assignment of a work-project to a worker by matching the skill requirements of each actual work-project with the skill set for each worker, and limiting the hours of each worker i to less than or equal to h(i), (f) deferring each work-project not assigned in step (e), (g) assigning using linear programming each work-project not deferred in step (f) to one of said workers, by matching the skill requirement of a work-project to the skill set of said worker, limiting the hours of said worker i to less than or equal to h(i), minimizing the aggregate travel time for said worker to reach the site of each work-project, and ignoring work-project time-commitments, producing a third assignment of work-projects to said worker, (h) ordering by time the third assignment of work-projects of step (g) for each worker, (i) comparing the time-commitment of each work-project to the ordering by time of step (h), and selecting those work-projects whereby the time-commitment has been exceeded, and (j) correcting the assignment of a work project selected in step (i).

2. The method of claim 1 wherein work-project data further includes, a specified priority p(j) for accomplishing a work-project j, a standard work time for SWT(j) for each work-project i.

3. The method of claim 2 wherein the worker data further includes, the expected hours to be worked x(i,j) by worker i on work-project j.

4. The method of claim 3 wherein step (c) further comprises the step of, maximizing the value of the expression $$\sum_{i,j} p(j) * x(i, j) \text{ for all } i, j$$

subject to the constraints $$\sum_{j} x(i, j) \leq h(i) \text{ for all } j, \text{ and}$$

$$\sum_{i} x(i, j) \leq SWT(j) \text{ for all } i, \text{ and}$$

$$x(i, j) \geq 0 \text{ for all } i, j.$$

5. The method of claim 1 wherein step (g) further comprises the steps of, determining a travel time (t(i,j)) for a worker i to travel to work-project j, minimizing the value of the expression $$\sum_{i,j} t(i, j) * x(i, j) \text{ for all } i, j$$

subject to the constraints $$\sum_{j} x(i, j) \leq h(i) \text{ for all } j, \text{ and}$$

$$\sum_{i} x(i, j) \leq SWT(j) \text{ for all } i, \text{ and}$$

$$x(i, j) \geq 0 \text{ for all } i, j.$$

6. An automated machine apparatus for assigning a plurality of work-projects to be performed by a plurality of workers, each work-project having specified requirements for completion of the work-project and each worker having associated therewith specified capabilities for performing said work-projects, said apparatus comprising:

(a) means for receiving both actual and forecast work-project data identifying a work-project j, including the skill requirements required for said work-project, and a time-commitment for completing said work-project, (b) means for receiving worker data identifying a worker i, including skill set for said worker and the hours available h(i) for said worker, (c) a first linear programming means for producing a first assignment of a work-project to a worker by matching the skill requirements of each actual and forecast work-project with the skill set for each worker, and limiting the hours of each worker i to less than or equal to h(i), (d) means for deferring each work-project not assigned in step (c), (e) a second linear programming means for producing a second assignment of a work-project to a worker by matching the skill requirements of each actual work-project with the skill set for each worker, and limiting the hours of each worker i to less than or equal to h(i), (f) means for deferring each work-project not assigned in step (e), (g) a third linear programming means for assigning each work-project not deferred in step (f) to a worker, by matching the skill requirement of a work-project to the skill set of a worker, limiting the hours of each worker i to less than or equal to h(i), minimizing the aggregate travel time for said worker to reach the site of each work-project, ignoring work-project time-commitments, and producing a third assignment of work-projects to each worker, (h) means for ordering by time the third assignment of work-projects of step (g) for each worker, (i) means for comparing the time-commitment of each work-project to the ordering by time of step (h), and selecting those work-projects whereby the time-commitment has been exceeded, (j) means for correcting the assignment of a work project selected in step (i).

* * * * *